(12) United States Patent
Karabinis (10) Patent No.: US 7,796,986 B2
(45) Date of Patent: Sep. 14, 2010

(54) MODIFICATION OF TRANSMISSION VALUES TO COMPENSATE FOR INTERFERENCE IN A SATELLITE DOWN-LINK COMMUNICATIONS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 696 days.

(21) Appl. No.: 11/367,065

(22) Filed: Mar. 3, 2006

(65) Prior Publication Data

US 2006/0217070 A1 Sep. 28, 2006

Related U.S. Application Data

(60) Provisional application No. 60/660,755, filed on Mar. 11, 2005.

(51) Int. Cl.
*H04W 4/00* (2009.01)
(52) U.S. Cl. .................. 455/430; 455/448; 455/427
(58) Field of Classification Search .......... 455/430, 455/432.2, 447, 448, 427–429, 114.2–114.3, 455/133–136, 140, 230–231, 269, 272, 277.2, 455/278.1, 303
See application file for complete search history.

(56) References Cited

U.S. PATENT DOCUMENTS

| | | | |
|---|---|---|---|
| 4,901,307 | A | 2/1990 | Gilhousen et al. |
| 5,073,900 | A | 12/1991 | Mallinckrodt |
| 5,303,286 | A | 4/1994 | Wiedeman |
| 5,339,330 | A | 8/1994 | Mallinckrodt |

(Continued)

FOREIGN PATENT DOCUMENTS

EP 0 597 225 A1 5/1994

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Edward Urban
*Assistant Examiner*—Christian A Hannon
(74) *Attorney, Agent, or Firm*—Myers Bigel Sibley and Sajovec, P.A.

(57) ABSTRACT

Methods of compensating for interference in communications in a satellite communications system are provided. At a first radioterminal, a measure of an error in communications received through a first service down-link from a satellite is generated. A communications waveform is identified which causes interference to communications through the first service down-link to the first radioterminal when it is transmitted to a second radioterminal at a frequency that is substantially the same as a frequency of the first service down-link. The measure of the error and a measure of the interfering communications waveform are processed to obtain at least one interference compensation value. The at least one interference compensation value is combined with a waveform that is to be transmitted to the first radioterminal to obtain an interference compensated waveform. The interference compensated waveform is transmitted to the first radioterminal through the first service down-link.

46 Claims, 4 Drawing Sheets

U.S. PATENT DOCUMENTS

| | | | |
|---|---|---|---|
| 5,394,561 | A | 2/1995 | Freeburg |
| 5,446,756 | A | 8/1995 | Mallinckrodt |
| 5,448,623 | A | 9/1995 | Wiedeman et al. |
| 5,511,233 | A | 4/1996 | Otten |
| 5,555,257 | A | 9/1996 | Dent |
| 5,584,046 | A | 12/1996 | Martinez et al. |
| 5,612,703 | A | 3/1997 | Mallinckrodt |
| 5,619,525 | A | 4/1997 | Wiedeman et al. |
| 5,631,898 | A | 5/1997 | Dent |
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,463 | A | 2/2000 | Wiedeman et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,236,354 | B1 | 5/2001 | Krasner |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,542,716 | B1* | 4/2003 | Dent et al. ................. 455/13.1 |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman |
| 6,775,330 | B2* | 8/2004 | Bach et al. .................. 375/296 |
| 6,785,543 | B2 | 8/2004 | Karabinis |
| 6,856,787 | B2 | 2/2005 | Karabinis |
| 6,859,641 | B2* | 2/2005 | Collins et al. ............... 455/63.1 |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,418,053 | B2* | 8/2008 | Perlman et al. ............. 375/267 |
| 7,580,700 | B2* | 8/2009 | Martin ........................ 455/411 |
| 2002/0044614 | A1* | 4/2002 | Molnar et al. ............... 375/346 |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2002/0178263 | A1* | 11/2002 | Hreha et al. ................. 709/226 |
| 2003/0003815 | A1 | 1/2003 | Yamada |
| 2003/0022625 | A1 | 1/2003 | Otten et al. |
| 2003/0054761 | A1 | 3/2003 | Karabinis |
| 2003/0054762 | A1 | 3/2003 | Karabinis |
| 2003/0054814 | A1 | 3/2003 | Karabinis |
| 2003/0054815 | A1 | 3/2003 | Karabinis |
| 2003/0068978 | A1 | 4/2003 | Karabinis et al. |
| 2003/0149986 | A1 | 8/2003 | Mayfield et al. |
| 2003/0153308 | A1 | 8/2003 | Karabinis |
| 2003/0156603 | A1* | 8/2003 | Rakib et al. ................. 370/485 |
| 2004/0014437 | A1* | 1/2004 | Gerhaeuser et al. ...... 455/114.3 |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 | 4/2005 | Singh et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0250468 | A1* | 11/2005 | Lu et al. ..................... 455/403 |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |
| 2006/0094352 | A1 | 5/2006 | Karabinis |
| 2006/0094420 | A1 | 5/2006 | Karabinis |
| 2006/0111041 | A1 | 5/2006 | Karabinis |

FOREIGN PATENT DOCUMENTS

| | | |
|---|---|---|
| EP | 0 732 814 A2 | 9/1996 |
| EP | 0 506 255 B1 | 11/1996 |
| EP | 0 748 065 A2 | 1/1997 |
| EP | 0 755 163 A2 | 1/1997 |
| EP | 0 762 669 A2 | 3/1997 |

| | | | |
|---|---|---|---|
| EP | 0 762 669 | A3 | 3/1997 |
| EP | 0 797 319 | A2 | 9/1997 |
| EP | 0 831 599 | A2 | 3/1998 |
| EP | 0 831 599 | A3 | 3/1998 |
| EP | 1 059 826 | A1 | 12/2000 |
| EP | 1 193 989 | A1 | 4/2002 |
| WO | WO 01/54314 | A1 | 7/2001 |

OTHER PUBLICATIONS

Ayyagari et al., "A satellite-augmented cellular network concept", *Wireless Networks*, Vo. 4, 1998, pp. 189-198.

International Search Report for PCT/US2006/008968; Date of mailing Jul. 3, 2006.

* cited by examiner

MODIFICATION OF TRANSMISSION VALUES TO COMPENSATE FOR INTERFERENCE IN A SATELLITE DOWN-LINK COMMUNICATIONS

CROSS-REFERENCE TO RELATED APPLICATION

This application claims the benefit of provisional U.S. Patent Application No. 60/660,755, filed Mar. 11, 2005 with the U.S. Patent Office, entitled Interference Reduction in Forward Link Satellite Communications by Pre-Distortion, the disclosure of which is hereby incorporated herein by reference in its entirety as if set forth fully herein.

FIELD OF THE INVENTION

This invention relates to wireless communications systems and methods, and more particularly to satellite communications systems and methods.

BACKGROUND

Satellite radioterminal communications systems and methods are widely used for radioterminal communications. Satellite radioterminal communications systems and methods generally employ at least one space-based component, such as one or more satellites that is/are configured to wirelessly communicate with a plurality of satellite radioterminals.

A satellite radioterminal communications system or method may utilize a single antenna pattern (i.e., a global beam) to cover an entire area (i.e., service region) served by the system. Alternatively, or in combination with the above, in cellular satellite radioterminal communications systems and methods, multiple antenna patterns (e.g., beams or cells) are provided, each of which can serve substantially a distinct geographical area in an overall service region, to collectively serve an overall satellite footprint. Thus, a cellular architecture similar to that used in conventional terrestrial cellular radioterminal systems and methods can be implemented in cellular satellite-based systems and methods. The satellite typically communicates with radioterminals over a bidirectional communications pathway, with radioterminal communications signals being communicated from the satellite to a radioterminal over a service down-link (forward-link), and from the radioterminal to the satellite over a service up-link (return-link).

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet and/or Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A radioterminal also may be referred to herein as a "radiotelephone," a "mobile terminal," a "mobile user device," a "user device" or simply as a "terminal." Furthermore, as used herein, the term "space-based component" or "space-based system" includes one or more satellites at any orbit (geostationary, substantially geostationary, medium earth orbit, low earth orbit, etc.) and/or one or more other objects and/or platforms (e. g., airplanes, balloons, unmanned vehicles, space crafts, missiles, etc.) that has/have a trajectory above the earth at any altitude.

As is well known to those having skill in the art, terrestrial networks can enhance cellular satellite radioterminal system availability, efficiency and/or economic viability by terrestrially using/reusing at least some of the frequencies that are allocated for use and/or are used by cellular satellite radioterminal systems. In particular, it is known that it may be difficult for cellular satellite radioterminal systems to reliably serve densely populated areas, because satellite signals may be blocked by high-rise structures and/or may not penetrate into buildings. As a result, a satellite band of spectrum may be underutilized or unutilized in such areas. The use of terrestrial transmission/retransmission of all or some of the satellite band frequencies can reduce or eliminate this problem.

Moreover, the capacity of an overall hybrid system, comprising space-based and terrestrial communications capability, can be increased significantly by the introduction of terrestrial transmission/retransmission of frequencies, since terrestrial frequency reuse can be much denser than that of a satellite-only system. In fact, capacity can be enhanced where it may be mostly needed, i.e., in and/or proximate to densely populated urban, industrial, and/or commercial areas. As a result, the overall system can become much more economically viable, as it may be able to serve a much larger subscriber base. Finally, satellite radioterminals for a satellite radioterminal system having a terrestrial component within the same satellite frequency band and using substantially the same air interface for both terrestrial and satellite communications can be more cost effective and/or aesthetically appealing. Exemplary conventional dual band and dual mode satellite and terrestrial radiotelephone systems include Thuraya, Iridium and Globalstar.

U.S. Pat. No. 6,684,057 issued Jan. 27, 2004, to the present inventor Karabinis, and entitled *Systems and Methods for Terrestrial Reuse of Cellular Satellite Frequency Spectrum*, the disclosure of which is hereby incorporated herein by reference in its entirety as if set forth fully herein, describes that a satellite radioterminal frequency can be reused terrestrially by an ancillary terrestrial network even within the same satellite cell, using interference cancellation techniques. In particular, the satellite radioterminal system according to some embodiments of U.S. Pat. No. 6,684,057 includes a space-based component that is configured to receive wireless communications from a first radioterminal in a satellite footprint over a satellite radioterminal frequency band, and an ancillary terrestrial network that is configured to receive wireless communications from a second radioterminal in the satellite footprint over the satellite radioterminal frequency band. The space-based component also receives the wireless communications from the second radioterminal in the satellite footprint over the satellite radioterminal frequency band as interference, along with the wireless communications that are received from the first radioterminal in the satellite footprint over the satellite radioterminal frequency band. An interference reducer is configured to reduce the interference from the wireless communications that are received by the space-based component from the first radioterminal in the satellite footprint over the satellite radioterminal frequency band, using the wireless communications that are received by the ancillary terrestrial network from the second radioterminal in the satellite footprint over the satellite radioterminal frequency band.

United States Patent Application Publication No. 2003/0054761 A1, published Mar. 20, 2003 to the present inventor Karabinis and entitled *Spatial Guardbands for Terrestrial Reuse of Satellite Frequencies*, the disclosure of which is hereby incorporated herein by reference in its entirety as if set forth fully herein, describes satellite radioterminal systems that include a space-based component that is configured to provide wireless radioterminal communications in a satellite footprint over a satellite radioterminal frequency band. The satellite footprint is divided into a plurality of satellite cells, in which satellite radioterminal frequencies of the satellite radioterminal frequency band are spatially reused. An ancillary terrestrial network is configured to terrestrially reuse at least one of the ancillary radioterminal frequencies that is used in a satellite cell in the satellite footprint, outside the cell and in some embodiments separated therefrom by a spatial guardband. The spatial guardband may be sufficiently large to reduce or prevent interference between the at least one of the satellite radioterminal frequencies that is used in the satellite cell in the satellite footprint, and the at least one of the satellite radioterminal frequencies that is terrestrially reused outside the satellite cell and separated therefrom by the spatial guardband. The spatial guardband may be about half a radius of a satellite cell in width.

United States Patent Application Publication No. US 2003/0054815 A1, published Mar. 20, 2003 to the present inventor Karabinis, and entitled *Methods and Systems for Modifying Satellite Antenna Cell Patterns in Response to Terrestrial Reuse of Satellite Frequencies*, the disclosure of which is hereby incorporated herein by reference in its entirety as if set forth fully herein, describes that space-based wireless radioterminal communications are provided in a satellite footprint over a satellite radioterminal frequency band. The satellite footprint is divided into satellite cells in which satellite radioterminal frequencies of the satellite radioterminal frequency band are spatially reused. At least one of the satellite radioterminal frequencies that is assigned to a given satellite cell in the satellite footprint is terrestrially reused outside the given satellite cell. A radiation pattern of at least the given satellite cell is modified to reduce interference with the at least one of the satellite radioterminal frequencies that is terrestrially reused outside the given satellite cell.

Although various cellular satellite radioterminal systems and methods have been proposed for reducing interference among the components of those systems, continued improvements in reducing interference are desirable.

SUMMARY

According to some embodiments of the present invention, methods of compensating for interference in communications in a satellite communications system are provided. At a first radioterrminal, a measure of an error in communications received through a first service down-link from a satellite is generated. A communications waveform is identified which causes interference to communications through the first service down-link to the first radioterminal when it is transmitted to a second radioterminal at a frequency that is substantially the same as a frequency of the first service down-link. The measure of the error and a measure of the interfering waveform are processed to obtain at least one interference compensation value. The at least one interference compensation value is combined with a waveform that is to be transmitted to the first radioterminal to obtain an interference compensated waveform. The interference compensated waveform is transmitted to the first radioterminal through the first service down-link. The first radioterminal may thereby be less susceptible to effects of interference caused by communications to the second radioterminal at a frequency that is substantially the same as that used to communicate with the first radioterminal.

Related interference compensators (i.e., interference reducers), radioterminals, and satellite communications systems are also provided.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The symbol "/" is also used as a shorthand notation for "and/or".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention.

Moreover, as used herein, "substantially the same" band(s) means that two or more bands being compared substantially overlap in frequency, but that there may be some areas of non-overlap, for example at a band end(s). "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

Terrestrial use/reuse of satellite band frequencies, by radioterminals and/or terrestrial infrastructure components (also referred to as base stations, ancillary terrestrial components or ATCs, and/or ancillary terrestrial networks or ATNs), may subject a satellite communications system to up-link and/or down-link interference. It will be understood by those skilled in the art that although embodiments of the invention are presented herein in the context of satellite system(s), the present invention may be used in any communications system of any architecture, wireless or not, space-based and/or terrestrial.

Interference with communications and/or signaling waveforms from a satellite to a radioterminal through a service down-link, referred to as down-link interference (also referred to as forward-link interference), can be caused by waveforms from the same or different satellite(s) that are radiated through down-links to other radioterminals using the same, substantially the same, adjacent and/or non-adjacent frequencies as those frequencies used to transmit information to the radioterminal that is experiencing interference. Interference with communications and/or signaling waveforms from a satellite to a radioterminal through a service down-link can also be caused by transmissions of waveforms between radioterminals and ancillary terrestrial components (e.g., base stations) using the same, substantially the same, adjacent and/or non-adjacent frequencies as the satellite service down-link. The waveforms from the same or different satellite(s) that are radiated through down-links to other radioterminals using the same, substantially the same, adjacent and/or non-adjacent frequencies as those frequencies used to transmit information to the radioterminal that is experiencing interference, may be based on one or more air interface protocol(s) that is/are the same, substantially the same or different therebetween and/or compared to an air interface protocol that is used by the communications and/or signaling waveforms from the satellite to the radioterminal through the service down-link. Also, the waveforms between radioterminals and ancillary terrestrial components (e.g., base stations) using the same, substantially the same, adjacent and/or non-adjacent frequencies as the satellite service down-link frequencies, used to transmit information to the radioterminal that is experiencing interference, may be based on one or more air interface protocol(s) that is/are the same, substantially the same or different therebetween and/or compared to an air interface protocol that is used by the communications and/or signaling waveforms from the satellite to the radioterminal through the service down-link. An exemplary ancillary terrestrial component that uses satellite frequencies to communicate with radioterminals is discussed in U.S. Pat. No. 6,684,057, to the present inventor Karabinis, entitled *Systems and Methods for Terrestrial Reuse of Cellular Satellite Frequency Spectrum*, the disclosure of which is hereby incorporated herein by reference in its entirety as if set forth fully herein.

Figure 1:
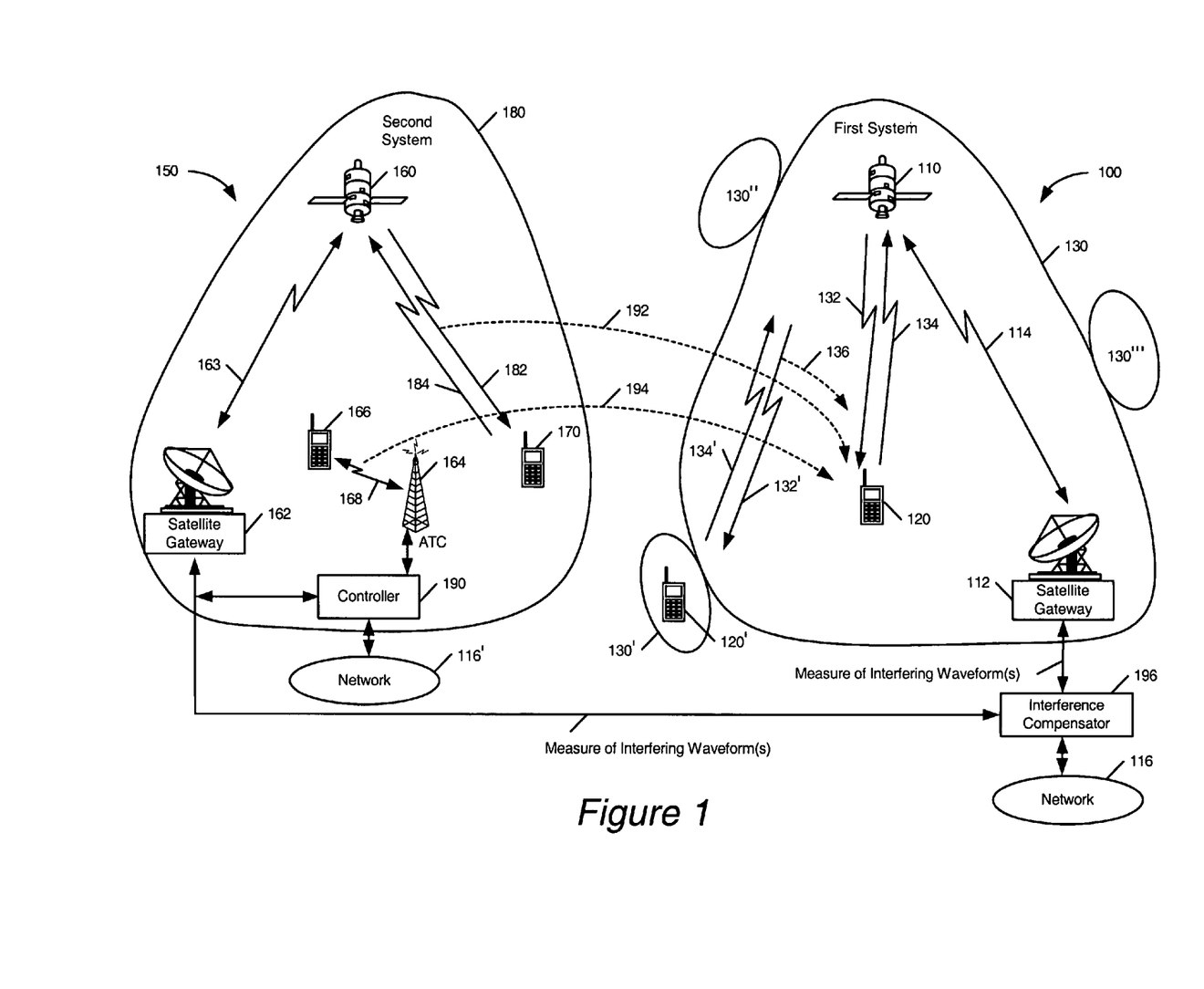
FIG. 1 is a block diagram illustrating communications systems according to some embodiments of the present invention.

FIG. 1 is a schematic diagram of satellite radioterminal communications systems and methods according to some embodiments of the present invention. Referring to FIG. 1, a first satellite communications system 100 includes a space-based component comprising at least one satellite 110. The system 100 also comprises a satellite gateway 112. The satellite 110 is configured to transmit wireless communications to a plurality of radioterminals 120-120' in a satellite footprint comprising one or more satellite radioterminal cells 130-130''' over one or more service down-links 132-132'. The satellite 110 may also be configured to receive wireless communications from the plurality of radioterminals 120-120' over one or more service up-links 134-134'. The satellite gateway 112 may be configured to transmit communications from a network 116, such as a wireline network (e.g., Public Switched Telephone Network (PSTN)) and/or wireless network (e.g., a cellular/PCS network), through a feeder link 114 to the satellite 110 for subsequent relay to the radioterminals 120-120' via the service down-links 132-132', and/or to receive communications from the radioterminals 120-120' via the service up-links 134-134', satellite 110, and the feeder link 114 for communications through the network 116.

When the frequencies of the service down-links 132-132' are sufficiently close or the same as one another, the radioterminal 120 can undesirably receive a component of communications on downlink 132' to radioterminal 120' as interference to communications that it receives on downlink 132. More specifically, a potential interference path is shown at 136. This interference would generally be strongest when the frequencies of the service down-links 132-132' are the same, substantially the same and/or adjacent.

A second satellite communications system 150 may contain other potential sources of interference to down-link communications from satellite 110 to radioterminal 120. The second satellite communications system 150 may include at least one satellite 160, a satellite gateway 162, and at least one ancillary terrestrial component 164 (the system 100 may also include at least one ancillary terrestrial component; not illustrated in FIG. 1). The satellite 160 is configured to communicate with at least one radioterminal 170 in a satellite footprint comprising one or more satellite radioterminal cells 180 over one or more service down-links 182 and/or one or more service up-links 184. The geographic area of the cell 180 of satellite 160 may at least partially overlap with the geographic areas of the cells 130-130''' of satellite 110, or the geographic area of the cell 180 of satellite 160 may be adjacent and/or substantially non-overlapping with the geographic areas of the cells 130-130''' of satellite 110, as illustrated in FIG. 1. The gateway 162 is configured to communicate with the satellite 160 through a feeder link 163, and/or to interface the satellite 160 and radioterminal 170 to a network 116', which may be the same as network 116.

The ancillary terrestrial component 164, which may be a base station, is configured to communicate with one or more radioterminals 166 through a terrestrial communication link 168 using frequencies that may be the same as, substantially the same as or adjacent to those used by satellite 160 to communicate with the radioterminal 170 through the down-link 182 and/or up-link 184. Ancillary terrestrial systems are also discussed in U.S. Continuation-in-Part patent application Ser. No. 10/730,660, to the present inventor Karabinis and entitled *Systems and Methods for Terrestrial Reuse of Cellular Satellite Frequency Spectrum in a Time-Division Duplex Mode*, filed Dec. 8, 2003 and assigned to the assignee of the present invention, and which is hereby incorporated herein by reference in its entirety as if set forth fully herein. The system 150 may further include a controller 190 that is configured to route information among the ancillary terrestrial component 164, the satellite gateway 162, and the network 116'.

When the frequencies of the service down-link 182 and/or the terrestrial communication link 168 are the same as, or sufficiently close to, the frequencies of down-link 132, radioterminal 120 can undesirably receive a component of communications by satellite 160 on downlink 182 to radioterminal 170 and/or a component of communications between radioterminal 166 and ancillary terrestrial component 164 as interference to communications that it receives on downlink 132. More specifically, potential interference paths are shown at 192 and 194. Accordingly, terrestrial and/or satellite communications by components of the second system 150 (and/or terrestrial and/or satellite communications by components of the first system 100) can interfere with down-link communications to the radioterminal 120 in the first system 100.

In accordance with some embodiments of the present invention, a waveform that is to be communicated through the service down-link 132 to the radioterminal 120, is modified to compensate for the interference that it will be subjected to during transmission. The modified waveform is accordingly referred to as interference compensated waveform (or pre-distorted waveform). The radioterminal 120 may thereby be able to more accurately receive and decode the interference compensated waveform as the service down-link 132 is subjected to interference.

Figure 2:
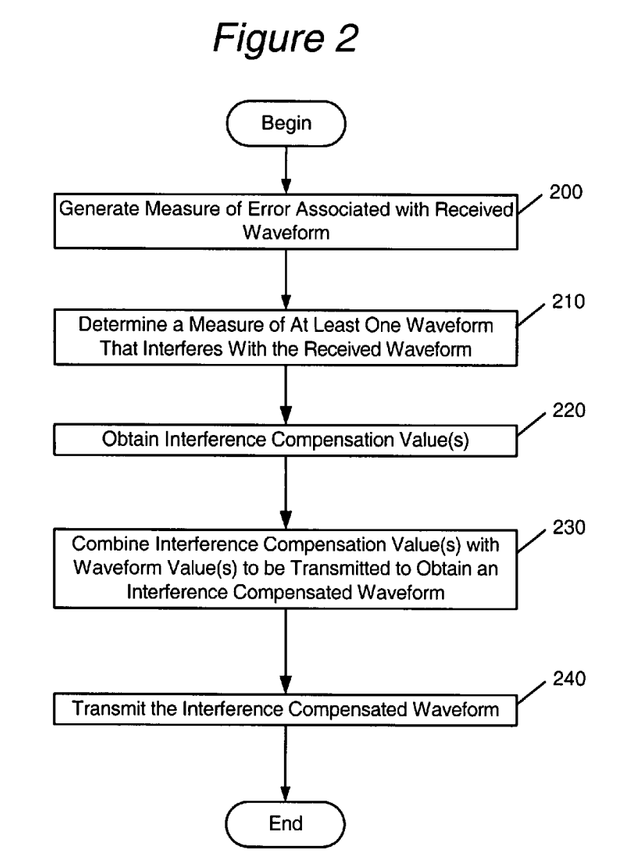
FIG. 2 is a flowchart diagram illustrating methods of compensating for interference in communications according to some embodiments of the present invention.

FIG. 2 illustrates a flowchart of methods for compensating for interference in accordance with some further embodiments of the present invention. With reference to FIGS. 1 and 2, the radioterminal 120 is configured to generate (Block 200) a measure of an error associated with a waveform that it receives through the service downlink 132. A measure of at least one second waveform, that causes interference to information transmitted through the service down-link 132 when the at least one second waveform is transmitted to a radioterminal other than radioterminal 120, is made (Block 210). The measure of the error and the measure of the at least one interfering waveform (i.e., the measure of at least one second waveform) are processed (Block 220) to obtain interference compensation value(s). The interference compensation value(s) are combined (Block 230) with values of a waveform that is to be transmitted to radioterminal 120, prior to transmitting the waveform to the radioterminal 120 over service downlink 132, to obtain interference compensated waveform values. The interference compensated waveform values are transmitted (Block 240) to the radioterminal 120 over the service down-link 132. As used herein "a measure" of an entity (such as, for example, a measure of an error or a measure of a waveform), may be the entity itself, at least one sample/element of the entity, a filtered version of the entity and/or any other representation of the entity that is derived from the entity by any operation (physical, mathematical, hardware, software, linear and/or non-linear) that is imposed on the entity.

The measure of the error may be generated at the radioterminal 120 by comparing at least one a priori known value of a received waveform (e.g., an a priori known value that a received waveform should have in the absence of noise, distortion and/or interference) to at least one waveform value that the radioterminal 120 receives over the down-link 132. The at least one a priori known value of the received waveform may, for example, be associated with a pilot signal of the waveform and/or pre-amble, mid-amble, frame header and/or any other waveform characteristic that may be a priori known to the receiver of the radioterminal 120. In combination with, or instead of, the above, the measure of the error may be derived by the radioterminal 120 by using a decision-directed technique (know to those skilled in the art) whereby the radioterminal 120 is configured to make at least one decision regarding the received waveform and to compare a level associated with the at least one decision to a level of the waveform received at the radioterminal 120.

The measure of the at least one interfering waveform may be determined (Block 210) as an aggregate measure of a plurality of interfering waveforms that are being transmitted, have been transmitted and/or are to be transmitted to at least some radioterminals other than radioterminal 120 using at least some frequencies that are substantially the same to at least some frequencies of the service down-link 132 and/or other frequencies. For example, the satellite 160, the satellite gateway 162, the controller 190, and/or any other component of the satellite communications system 150 can be configured to determine the measure of the at least one interfering waveform that interferes with transmissions made through the service downlink 132. The measure of the at least one interfering waveform can, for example, be representative of communications through the down-link 182 to radioterminal 170 and/or of communications through the terrestrial communication link 168 from/to the radioterminal 166 and ancillary terrestrial component 164. Similarly, the satellite 110, the satellite gateway 112, and/or another component of the first satellite communication system 100 can be configured to determine a measure of at least one interfering waveform that may be associated with, for example, down-link 132' communications to radioterminal 120' which may cause interference to transmissions made through the service downlink 132 to the radioterminal 120.

The measure of the error and the measure of the at least one interfering waveform may be communicated to an interference compensator 196. For example, the measure of the error can be relayed by the radioterminal 120 via a return link, such as return link 134 of FIG. 1, to the interference compensator 196 through the satellite 110 and the satellite gateway 112. Relaying the measure of the error to the interference compensator 196 may comprise using at least one frequency of a satellite frequency band and/or any other frequency band. In some embodiments, the measure of the error may be relayed by a radioterminal, such as radioterminal 120, to the interference compensator 196 via a return link of an ATC of system 100. In some embodiments, a first measure of the at least one interfering waveform may be relayed by system 150 to the interference compensator 196 via a wireless and/or wireline link (as illustrated in FIG. 1) and/or a second measure of at least one interfering waveform may be relayed by system 100 to the interference compensator 196 via a wireless and/or wireline link (as is also illustrated in FIG. 1). The first measure of the at least one interfering waveform may be used by interference compensator 196 to reduce inter-system interference and the second measure of the at least one interfering waveform may be used by interference compensator 196 to reduce intra-system interference. Although the interference compensator 196 has been illustrated as separate from the satellite 110 and satellite gateway 112, the interference compensator 196 may, according to some embodiments of the invention, be at least partially within the satellite 110, the satellite gateway 112, and/or within one or more other components of the first and/or second systems 100 and/or 150. An "interference compensator" may also be referred to herein as an "interference reducer."

Figure 3:
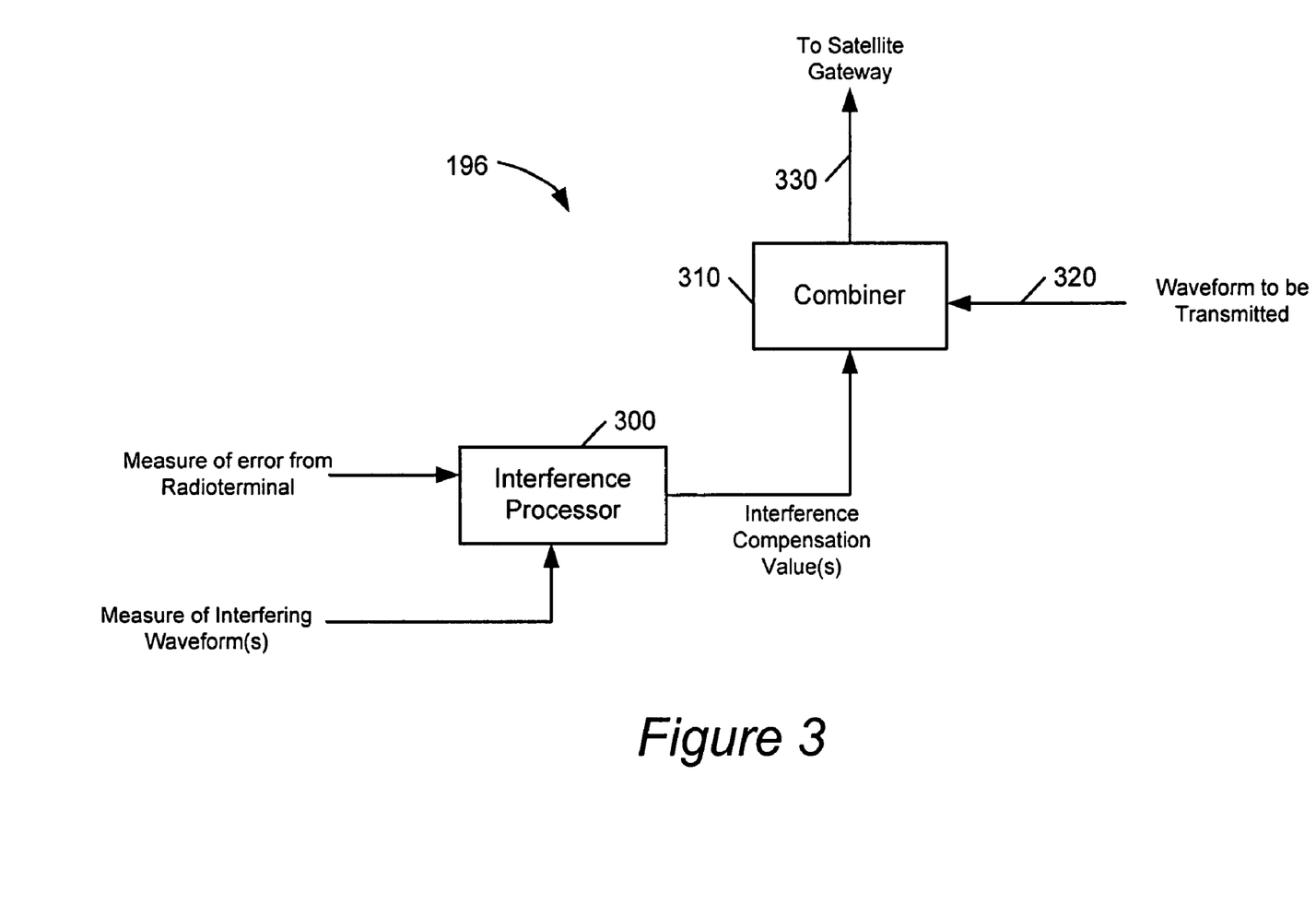
FIG. 3 is a block diagram illustrating an interference compensator according to some embodiments of the present invention.

FIG. 3 is a block diagram of the interference compensator 196 in accordance with some embodiments of the present invention. The interference compensator 196 includes an interference processor 300 and a combiner 310. The interference processor 300 processes the measure of the error and the measure of the at least one interfering waveform to obtain interference compensation value(s) (Block 220 of FIG. 2).

The interference compensation value(s) may be generated as a result of a correlation process that may be carried out between the measure of the error and the measure of the at least one interfering waveform. The correlation process may take place over discrete and/or continuous time intervals, over a pre-determined number of discrete time intervals and/or time epochs, over a pre-determined continuous-time interval and/or over substantially an entire time span associated with a communications interval and/or transmission of information interval. In some embodiments, the interference processor 300 may obtain the interference compensation value(s) by first substantially time aligning and then correlating the measure of the error and the measure of the at least one interfering waveform.

The interference processor 300 may include one or more transversal filters (and/or one or more other types of filters known to those skilled in the art that may be of a linear and/or non-linear nature) that may be configured to modify at least one component of the measure of the at least one interfering waveform to generate the interference compensation value(s) responsive to the correlation process between the measure of the error and at least one component of the measure of the at least one interfering waveform.

Figure 4:
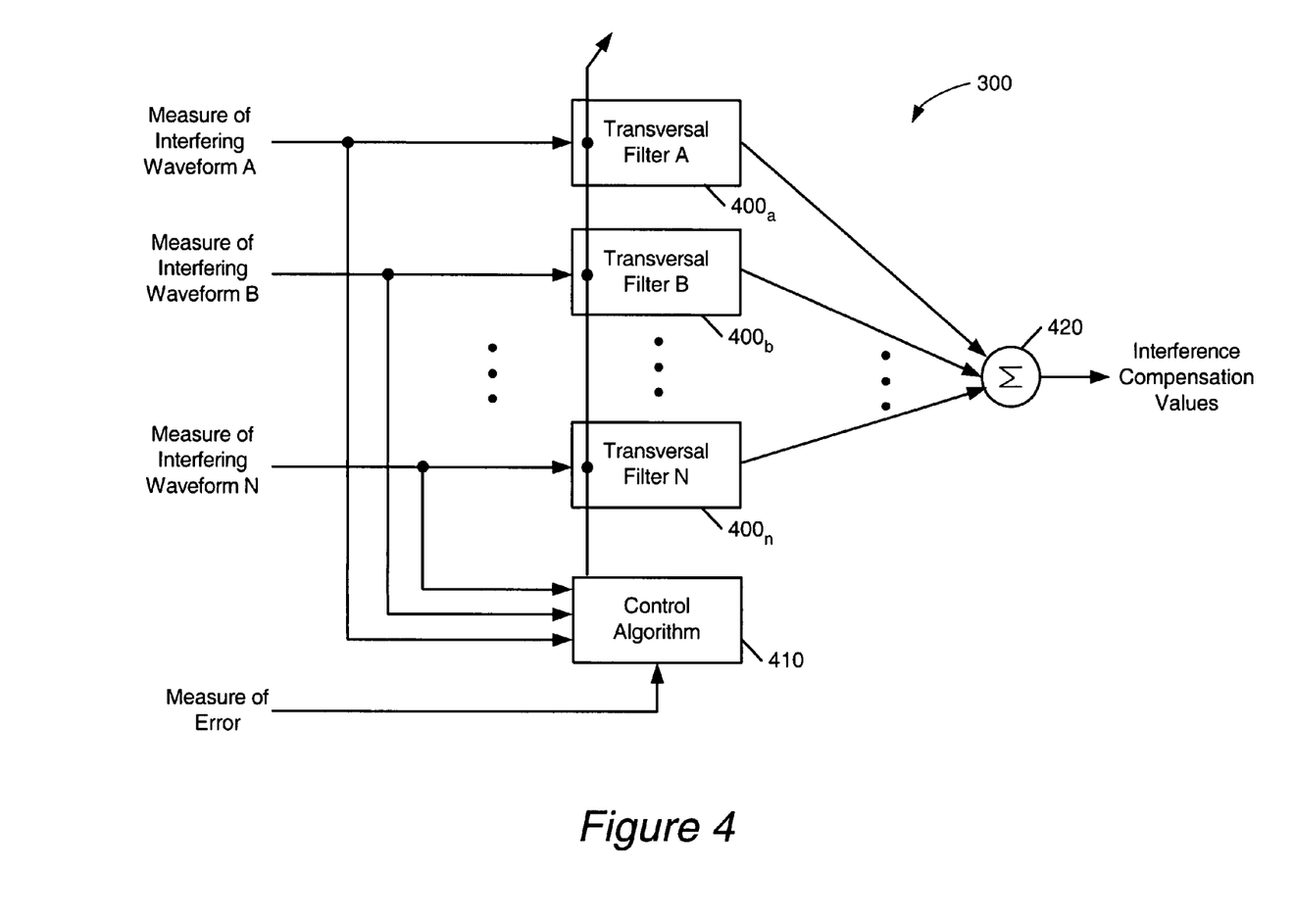
FIG. 4 is a block diagram illustrating an interference processor according to some embodiments of the present invention.

FIG. 4 illustrates a block diagram of an embodiment of the interference processor 300 and methods according to some embodiments of the present invention. The interference processor 300 includes a plurality of transversal filters 400a-n and a control algorithm 410. The transversal filters 400a-n may each respectively receive a measure of an interfering waveform which may be associated with a different one of the sources/paths of interference (e.g., interfering signal paths 136, 192, and/or 194). For example, transversal filter A (400a) may receive a measure of the interfering waveform/signal associated with communications/transmissions through down-link 132' to radioterminal 120'. Transversal filter B (400b) may receive a measure of the interfering waveform/signal associated with communications/transmissions through down-link 182 to radioterminal 170. Transversal filter N (400n) may receive a measure of the interfering waveform/signal associated with communications/transmissions through terrestrial link 168 between radioterminal 166 and the ancillary terrestrial component 164. The control algorithm 410 may be configured to adaptively adjust the filter coefficients of the transversal filters 400a-n in response to the measure of the error from, for example, radioterminal 120. The control algorithm 410 may also be configured, in some embodiments, to delay-equalize at least two of the measures of the interfering waveforms/signals therebetween and/or relative to the measure of the error. The control algorithm 410 may use an adaptive algorithm, such as, for example, a Least Mean Squared Error (LMSE), Kalman, Fast Kalman, Zero Forcing, various combinations thereof and/or any other algorithm known to those skilled in the art. The output from each of the transversal filters 400a-n may be combined (e.g., summed) at node 420 to generate the interference compensation values. The transversal filters 400a-n may each be of any architecture known to those skilled in the art, such as, for example, synchronously-spaced, fractionally-spaced and/or decision-feedback and each transversal filter 400a-n may include any number of taps and/or coefficients greater than or equal to one. The coefficients may be updated by any known linear and/or non-linear control law/algorithm.

Transversal filters are also described in Published U.S. Patent Application No. US 2003/0054814 to Karabinis et al., entitled *Systems and Methods for Monitoring Terrestrially Reused Satellite Frequencies to Reduce Potential Interference* which is assigned to the assignee of the present invention, the disclosure of which has been incorporated by reference as set forth above.

Referring again to FIG. 3, the combiner 310 may be configured to receive a waveform 320 which is intended for transmission to radioterninal 120 (see FIG. 1), and the combiner 310 may further be configured to combine (linearly and/or non-linearly) the waveform 320 with at least some of the interference compensation value(s) from the interference processor 300 to obtain an interference compensated waveform 330. More particularly, the combiner 310 may modify the waveform that is to be communicated to the radioterminal 120 based on the interference compensation value(s) from the interference processor 300 to compensate for interference that is expected to be introduced into the service down-link 132 when the interference compensated waveform 330 is transmitted through the service down-link 132 to the radioterminal 120. The interference compensated waveform 330 is communicated to the satellite gateway 112 where it may be further processed, such as encoded and/or time interleaved, and then transmitted through the feeder link 114 to satellite 110 and relayed through the service down-link 132 to the radioterminal 120.

Modification of the waveform 320, to create the interference compensated waveform 330, may be selectively carried out in response to the measure of the error exceeding a threshold value. For example, while the measure of the error from radioterminal 120 is below a threshold value (i.e., indicating that interference on down-link 132 is within an acceptable range), the combiner 310 may pass-through the waveform 320 to the satellite gateway 112 substantially unchanged/unmodified. In contrast, while the measure of the error from radioterminal 120 is at or above a threshold value (i.e., interference is above an acceptable range), the combiner 310 may combine (linearly and/or non-linearly) the waveform 320 with at least some of the interference compensation values to output the interference compensated waveform 330 to the satellite gateway 112.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of reducing interference, the method comprising:
   receiving at an interference reducer from a first radioterminal a measure of an error of a waveform that is received at the first radioterminal;
   receiving at the interference reducer from an electronic component a measure of at least one other waveform that has been transmitted to at least one second radioterminal and contributes an interference component to the waveform that is received at the first radioterminal, wherein the electronic component is separate from the first radioterminal and is also separate from the at least one second radioterminal;
   operating the interference reducer to process the measure of an error and the measure of at least one other waveform to generate at least one interference compensation value; and
   operating the interference reducer to combine the at least one interference compensation value with a waveform to generate an interference compensated waveform prior to transmission of the interference compensated waveform to the first radioterminal.

2. The method of claim 1, wherein the waveform that is received at the first radioterminal and the at least one other waveform that has been transmitted to the at least one second radioterminal and contributes an interference component to the waveform that is received at the first radioterminal include at least one common frequency.

3. The method of claim 2, wherein the waveform that is received at the first radioterminal includes at least one frequency that is not included in the at least one other waveform that has been transmitted to the at least one second radioterminal and contributes an interference component to the waveform that is received at the first radioterminal.

4. The method of claim 1, wherein the waveform that is received at the first radioterminal is received using a first air interface protocol, and the at least one other waveform that has been transmitted to at least one second radioterminal and contributes an interference component to the waveform that is received at the first radioterminal is transmitted to the at least one second radioterminal using a second air interface protocol that is different than the first air interface protocol.

5. The method of claim 4, wherein the waveform that is received at the first radioterminal is received through a satellite service link.

6. The method of claim 1, further comprising:
   communicating the measure of the error of the waveform that is received at the first radioterminal to the interference reducer using a frequency of a satellite frequency band.

7. The method of claim 6, wherein the interference reducer at least partially resides at a satellite or at a satellite gateway.

8. The method of claim 1, wherein the at least one other waveform that contributes an interference component to the waveform that is received at the first radioterminal is a waveform that is transmitted by a space-based or terrestrial component.

9. The method of claim 1, wherein:
   receiving at an interference reducer from a first radioterminal a measure of an error of a waveform comprises receiving the measure of the error at a satellite gateway that comprises the interference reducer.

10. The method of claim 9, wherein receiving the measure of the error at a satellite gateway comprises receiving the measure of the error using frequencies authorized for use by a space-based component.

11. The method of claim 1, wherein receiving at an interference reducer from a first radioterminal a measure of an error of a waveform that is received at the first radioterminal comprises:
    comparing at least one predetermined value to at least one value of the waveform that is received at the first radioterminal.

12. The method of claim 1, wherein receiving at an interference reducer from a first radioterminal a measure of an error of a waveform that is received at the first radioterminal comprises:
    making at least one decision and comparing at least one value associated with the at least one decision to at least one value of the waveform that is received at the first radioterminal.

13. The method of claim 1, wherein the combining comprises linear or non-linear combining.

14. The method of claim 1, wherein operating the interference reducer to combine the at least one interference compensation value with a waveform to generate an interference compensated waveform comprises:
    generating the at least one interference compensation value in response to correlating the measure of the at least one other waveform that has been transmitted to the at least one second radioterminal and contributes an interference component to the waveform that is received at the first radioterminal with the measure of the error.

15. The method of claim 1, wherein operating the interference reducer to combine the at least one interference compensation value with a waveform to generate an interference compensated waveform comprises:
    passing the measure of the at least one other waveform through at least one filter to generate the at least one interference compensation value, wherein the at least one filter is configured to modify the measure of the at least one other waveform using at least one coefficient that is changed in response to a change in the measure of the error.

16. The method of claim 1, wherein operating the interference reducer to combine the at least one interference compensation value with a waveform to generate an interference compensated waveform comprises:
    passing the measure of the at least one other waveform through a plurality of filters configured therebetween in parallel to generate the at least one interference compensation value, wherein the plurality of filters are each configured to modify a measure of the at least one other waveform using at least one coefficient that is changed in response to a change in the measure of the error.

17. The method of claim 1, wherein operating the interference reducer to combine the at least one interference compensation value with a waveform to generate an interference compensated waveform comprises carrying out at least one time alignment between the measure of the error and the measure of the at least one other waveform.

18. A communications system comprising:
    an electronic component;
    a transmitter; and
    an interference reducer that is configured to process a measure of an error of a waveform that is received at a first radioterminal and a measure of at least one other waveform that has been transmitted to at least one second radioterminal and contributes an interference component to the waveform that is received at the first radioterminal;
    wherein the interference reducer is configured to process the measure of an error and the measure of at least one other waveform in order to obtain at least one interference compensation value, and to combine the at least one interference compensation value with a waveform to generate an interference compensated waveform prior to the transmitter transmitting the interference compensated waveform to the first radioterminal;

wherein the measure of the error is received at the interference reducer from the first radioterminal; and wherein the electronic component is separate from the first radioterminal and is separate from the at least one second radioterminal, and the electronic component is configured to generate the measure of the at least one other waveform and to provide the measure of the at least one other waveform to the interference reducer.

19. The communications system of claim 18, wherein the waveform that is received at the first radioterminal and the at least one other waveform that has been transmitted to the at least one second radioterminal and contributes an interference component to the waveform that is received at the first radioterminal include at least one common frequency.

20. The communications system of claim 19, wherein the waveform that is received at the first radioterminal includes at least one frequency that is not included in the at least one other waveform that has been transmitted to the at least one second radioterminal and contributes an interference component to the waveform that is received at the first radioterminal.

21. The communications system of claim 18, wherein the transmitter is configured to transmit the interference compensated waveform to the first radioterminal based on a first air interface protocol, wherein the at least one other waveform that has been transmitted to the at least one second radioterminal and contributes an interference component to the waveform that is received at the first radioterminal is based on a second air interface protocol and wherein the first air interface protocol is different than the second air interface protocol.

22. The communications system of claim 21, wherein the transmitter is configured to transmit the interference compensated waveform to the first radioterminal using a satellite service link.

23. The communications system of claim 22, wherein the measure of an error of a waveform is received at the interference reducer using a frequency of a satellite frequency band.

24. The communications system of claim 23, wherein the interference reducer at least partially resides at a satellite or at a satellite gateway.

25. The communications system of claim 18, wherein the at least one other waveform that contributes an interference component to the waveform that is received at the first radioterminal is a waveform that is transmitted by a space-based or terrestrial component.

26. The communications system of claim 18, wherein the measure of an error of a waveform that is received at a first radioterminal is transmitted by the first radioterminal to the interference reducer.

27. The communications system of claim 26, wherein the first radioterminal is configured to transmit the measure of the error to a satellite gateway, wherein the satellite gateway comprises the interference reducer.

28. The communications system of claim 27, wherein the first radioterminal is configured to transmit the measure of the error to the satellite gateway using frequencies authorized for use by a space-based component.

29. The communications system of claim 18, wherein the first radioterminal is configured to generate the measure of an error of a waveform that is received at the first radioterminal based on a comparison of at least one predetermined value with at least one value of the waveform that is received at the first radioterminal.

30. The communications system of claim 18, wherein the first radioterminal is configured to generate the measure of an error of a waveform that is received at the first radioterminal based on the first radioterminal making at least one decision and comparing at least one value associated with the at least one decision to at least one value of the waveform that is received at the first radioterminal.

31. The communications system of claim 18, wherein the interference reducer is configured to use linear or non-linear combining to combine the at least one interference compensation value with a waveform to generate the interference compensated waveform.

32. The communications system of claim 18, wherein the interference reducer is configured to generate the at least one interference compensation value by correlating the measure of the at least one other waveform that contributes an interference component to the waveform that is received at the first radioterminal with the measure of the error of the waveform that is received at the first radioterminal.

33. The communications system of claim 18, wherein the interference reducer is configured to obtain the at least one interference compensation value by passing the measure of the at least one other waveform through at least one filter, wherein the at least one filter is configured to modify the measure of the at least one other waveform using at least one coefficient that is changed in response to a change in the measure of the error.

34. The communications system of claim 18, wherein the interference reducer is configured to obtain at least one interference compensation value by passing the measure of the at least one other waveform through a plurality of filters configured therebetween in parallel, wherein the plurality of filters are each configured to modify the measure of the at least one other waveform each using at least one coefficient that is changed in response to a change in the measure of the error.

35. The communications system of claim 18, wherein the interference reducer is configured to obtain at least one interference compensation value by carrying out at least one time alignment between the measure of the error and the measure of the at least one other waveform.

36. A method of compensating for interference in communications, the method comprising:

receiving from a first transceiver a measure of error in communications that are received at the first transceiver through a first service link;

determining, at an electronic component that is separate from the first transceiver, a measure of at least one waveform that causes interference to communications through the first service link to the first transceiver when the at least one waveform is transmitted to at least one second transceiver;

processing the measure of the error and the measure of the at least one waveform to obtain an interference compensation value;

combining the interference compensation value with a waveform that is to be transmitted to the first transceiver to obtain an interference compensated waveform; and transmitting the interference compensated waveform to the first transceiver through the first service link.

37. The method of claim 36, wherein the at least one waveform is transmitted to the at least one second transceiver using at least one frequency that is also used to transmit the interference compensated waveform to the first transceiver.

38. The method of claim 36, wherein combining the interference compensation value with a waveform to be transmitted to the first transceiver to obtain an interference compensated waveform comprises:

modifying the waveform to be transmitted to the first transceiver based on the interference compensation value to compensate for interference during transmission of the interference compensated waveform to the first transceiver through the first service link.

39. The method of claim 36, further comprising communicating the at least one waveform that causes interference through a second service link with a satellite.

40. The method of claim 39, wherein the first and second service links are with respective first and second different satellites.

41. The method of claim 36, wherein determining a measure of at least one waveform comprises:

using a terrestrial link to transport a measure of the at least one waveform to an interference compensator.

42. The method of claim 36, wherein the first transceiver comprises a radioterminal receiver and the at least one second transceiver comprises a radioterminal receiver.

43. A system comprising:

a waveform pre-distorter that is configured to receive a measure of an error of a waveform that is received at a first receiver, to receive a measure of an other waveform that is transmitted to a second receiver and contributes an interference component to the waveform received at the first receiver, to process the measure of the error and the measure of the other waveform to derive an interference compensation value by passing the measure of the other waveform through at least one filter that is configured to modify the measure of the other waveform using at least one coefficient that is changed in response to a change in the measure of the error, and to combine the interference compensation value with a waveform that is to be transmitted to the first receiver.

44. The system of claim 43, wherein the first receiver and the second receiver comprise respective first and second wireless receivers.

45. The system of claim 43, wherein the waveform pre-distorter is configured to combine the interference compensation value with the waveform that is to be transmitted to the first receiver to form a pre-distorted waveform such that during propagation of the pre-distorted waveform over a first link towards the first receiver, a level of interference from at least one other waveform that is propagating over at least one other link towards the second receiver, combines with the pre-distorted waveform to reduce a level of interference of the pre-distorted waveform.

46. The system of claim 45, wherein the first link comprises a wireless link and the at least one other link comprises at least one other wireless link.

\* \* \* \* \*